Patented Apr. 21, 1953

2,636,049

UNITED STATES PATENT OFFICE 2,636,049

NORMAL AND ISOPROPYL METHACRYLATE PRODUCTION

John William Croom Crawford, Welwyn Garden City, England, assignor to Imperial Chemical Industries Limited, a corporation of Great Britain No Drawing. Application January 23, 1950, Serial No. 140,144. In Great Britain February 18, 1949

4 Claims. (Cl. 260—486)

This invention relates to the production of useful polymerisable compounds, namely the normal- and isopropyl esters of methacrylic acid.

Methacrylic esters readily undergo ethenoid polymerisation under suitable influences such as heat, light and/or free radical-producing catalysts, to give macromolecular resinous polymers, which are distinguished by great transparency, and absence of colour. Polymethyl methacrylate is additionally distinguished by considerable hardness and toughness and a high softening temperature, which properties make it a desirable substance for fabrication of useful articles. It has, however, the disadvantage that over a long range of temperature above its softening point it retains a high viscosity, which makes it more difficult to fabricate into shaped forms, by means of hot extrusion, or injection moulding, for example, than some other thermoplastic resins such as polystyrene.

The polymers of alkyl methacrylates of alcohols having more than one carbon atom per molecule are softer, and have softening points lower than methyl methacrylate polymer, the diminution in these properties tending to increase as the homologous alcohol series is ascended.

Amongst the higher alkyl methacrylate polymers, polyisopropyl methacrylate is distinguished by the following properties:

The softening point of the polymer is comparatively high; the hardness of the polymer, although lower than that of the methyl ester polymer, is satisfactory; the shrinkage of the ester on polymerisation is much lower than that of the methyl ester, and the density of the polymer is also lower than that of the methyl ester polymer or of polystyrene. Comparative data are given below:

| Polymeric ester | $d_4^{20}$ | Shrinkage during polymerisation, percent | Vickers Hardness No. | Vicat Softening Temperature, °C. |
|---|---|---|---|---|
| Methyl | 1.187 | 20.6 | 25 | 119 |
| n-Propyl | 1.085 | 17.1 | 7 | 55 |
| i-Propyl | 1.033 | 14.3 | 13 | 88 |

In addition, in contrast to the behaviour of polymethyl methacrylate, polyisopropyl methacrylate shows a rapid decrease in viscosity with increase in temperature above its softening point, and is therefore well suited to shaping into articles by hot moulding and extrusion processes. Isopropyl methacrylate is also well suited to the production of many copolymers. In particular it is well suited to the production of copolymers with methyl methacrylate to obtain materials of excellent mechanical and optical properties having flow characteristics above their softening points intermediate between the characteristics of polymethyl methacrylate and polyisopropyl methacrylate.

Polymers of n-propyl methacrylate, and copolymers thereof, particularly with methyl methacrylate, are of good optical and mechanical properties, and are therefore suitable for a wide variety of applications as described, for example, in British patent specification No. 490,007.

The polypropyl methacrylates have the economic advantage over polymethyl methacrylate that they contain a lower proportion of methacrylate radical, which is the more expensive constituent of the ester molecule, viz:

Polymethyl methacrylate=69.0% methacrylyl
Polypropyl methacrylate=53.9% methacrylyl Methyl methacrylate may be prepared by conversion of acetone cyanhydrin to methacrylamide by reaction with sulphuric acid, and heating the resulting solution of the amide in sulphuric acid with methanol. This mode of preparation of esters is less well suited to the production of esters from the higher alcohols because of their greater tendency to dehydrate to olefines or ethers in the presence of hot sulphuric acid. This disadvantage is especially marked with secondary alcohols such as isopropanol, because of the comparative ease with which they are dehydrated to olefines, and because of their low esterification rates which necessitate prolonged reaction times in their esterification. n-Propyl methacrylate has previously been prepared by ester-interchange reaction of n-propyl alcohol and methyl methacrylate, or by reaction between n-propyl alcohol and methacrylyl chloride. These processes are, however, unsatisfactory because of high operating costs.

Higher alcohols, e. g. butanols or higher alcohols of limited water-solubility may be esterified by methacrylic acid by heating a mixture of the acid and alcohol in the presence of a mineral acid catalyst and an entrainer for removal of the water of esterification as an azeotrope. The water-miscible lower alcohols, methanol and ethanol, cannot conveniently be converted into methacrylic esters by this technique, because the rejected aqueous layer of the condensed azeotrope with for example, benzene or trichloroethylene entrainer, contains a large proportion of alcohol, which on economic grounds would have to be recovered by redistillation of the aqueous layer, necessitating a separate alcohol recovery plant and increased operating costs.

We have now made the surprising discovery, however, that, although propanol and isopropanol are both miscible in all proportions with water, when a system containing water, a propanol and an entrainer such as trichloroethylene is distilled, a ternary azeotrope is formed which on condensation separates into two layers, the aqueous portion of which contains relatively little propanol, so that, in fact, methacrylic acid may be esterified by propanol in the presence of such an azeotrope forming entrainer, without appreciable loss of propanol in the rejected aqueous layer.

Data obtained by examination of water-propanol-trichloroethylene ternary azeotropes is set out in the following table:

|  | n-Propanol azeotrope, B. P. 70-72° C./1 atm. | | i-Propanol azeotrope, B. P. 68.5° C./1 atm. | |
| --- | --- | --- | --- | --- |
|  | Upper layer | Lower layer | Upper layer | Lower layer |
| Volume, percent of total condensate | 11.2 | 88.8 | 7.9 | 92.1 |
| $d_4^{20}$ | 0.99 | 1.33 | 0.97 | 1.27 |
| Weight, percent of total condensate | 8.6 | 91.4 | 6.1 | 93.9 |
| Composition, weight, percent: |  |  |  |  |
| Trichloroethylene | 0 | 84 | 0.1 | 78.4 |
| Water | 84 | 1 | 80 | 1.1 |
| Propanol | 16 | 15 | 20 | 20.5 |
| Loss of propanol with 1 mole water rejected as aqueous layer, in moles | 0.057 |  | 0.075 |  |

Similarly, the loss of isopropanol when using benzene as the entrainer is 0.070 mole per mole of water in the aqueous phase of the condensed azeotrope.

In contrast, when methanol and trichloroethylene are used, the loss of methanol in the aqueous layer is about 1.7 mole, together with about 0.15 mole of trichloroethylene, both per mole of water rejected, whilst with ethanol, the loss of alcohol is 0.45 mole, with 0.02 mole trichloroethylene, per mole of water.

We have also discovered that the propyl methacrylates do not form binary azeotropes with benzene or trichloroethylene, or with the corresponding alcohols as, e. g. does methyl methacrylate with methanol. The esters may therefore be separated from the other components of the esterification reaction mixture by fractional distillation.

An object of the present invention is to provide an economic process for the production of useful polymerisable materials in a pure state and in good yield. Another object is to provide such a process for the production of the propyl methacrylates. A further object is to provide such a process which will involve only the use of normal commercial equipment. Other objects will appear hereinafter.

According to the present invention these objects are accomplished by a process which comprises the steps of reacting normal or isopropyl alcohol with methacrylic acid in the presence of a polymerisation inhibitor while removing the water of reaction by azeotropic distillation and then separating the propyl methacrylate from the reaction product by fractional distillation. To minimise polymerization the fractional distillation is best carried out under reduced pressure and it may also be desirable to add the polymerization inhibitor to the reaction mixture in two stages, viz., initially and before fractional distillation.

Suitable azeotrope-forming liquids for use in this process are benzene, ethylene dichloride, chloroform, di-isopropyl and di-n-propyl ethers, and trichloroethylene.

The following examples will further illustrate the process of this invention. It is to be understood, however, that the invention is in no way limited by these examples.

EXAMPLE 1

The following reagents were used:

Isopropanol, technical quality, containing 1.1% water.
Trichloroethylene recovered from a previous preparation of isopropyl methacrylate, and containing 0.03% water, 1.15% isopropanol and 1.29% isopropyl methacrylate, acid value less than 0.1.
Methacrylic acid, distilled material, 100% by alkali titration.

4290 grams of isopropanol (10% excess over theoretical), 130 grams of hydroquinone, 130 grams of 98% sulphuric acid, 5590 grams of methacrylic acid and 8125 grams of trichloroethylene were mixed in that order and heated in a twenty-litre flask provided with a well-lagged forty-two inch fractionating column of 1½" bore packed with ¼" glass rings and surmounted by a reflux condenser and automatic separator to return the trichloroethylene-rich phase of the condensate and reject the water-rich phase. A slow stream of air was passed into the reaction mixture through a fine glass capillary to assist the polymerization inhibiting action of the hydroquinone.

The reaction mixture was gently boiled so that a thermometer at the top of the column registered a temperature close to the boiling point of the water-isopropanol-trichloroethylene ternary azeotrope (68.5° C.). Distillation was continued until no more aqueous layer was rejected, which took about 48 hours. 1530 cc. of aqueous layer were formed, having a density of 0.97 and containing 18.7 grams isopropanol per 100 cc. Allowing for the water content of the reagents the water rejected corresponded to 98.2% of the theoretical value for complete esterification of the methacrylic acid.

The cooled reaction mixture was washed with water, then with 10 per cent sodium hydroxide solution until permanently alkaline to phenolphthalein indicator, and finally twice with water.

After addition of 70 grams of hydroquinone the washed reaction product was fractionally distilled at a pressure of 200 mm. of mercury, using a sixty-inch column packed with glass rings and allowing a reflux ratio of above five to one during removal of the trichloroethylene.

The following fractions were collected:

| Fraction | 1 | 2 | 3 |
|---|---|---|---|
| Distillation range | Up to 55° C./200 mm | 55–85.5° C./200 mm | 85.5° C./200 mm. |
| Yield (gm.) | 6,960 | 1,111 | 6,929. |
| Acid value (mgm. KOH/gm.) | nil | | nil. |
| Analysis (percent by weight): | | | |
| Water | 0.04 | nil | Do. |
| Isopropanol | nil | do | Do. |
| Isopropyl methacrylate | 0.5 | 49.9 | 100. |
| Trichloroethylene | 99.46 | 50.1 | nil. |

The residue, which was of partially polymerised syrupy nature, amounted to 260 grams (allowing for hydroquinone).

The density of pure isopropyl methacrylate at 20° C. is 0.8847 gram/cc.; refractive index $n_D^{20}$ 1.4122, boiling point 126–126.3° C./744 mm.

Distribution of the yield of isopropyl methacrylate calculated on the weight of methacrylic acid, was as follows:

Fraction 1 _____ 0.4% theoretical yield
Fraction 2 _____ 6.7% theoretical yield
Fraction 3 _____ 83.3% theoretical yield
Residue (monomer + polymer) _____ 2.3% theoretical yield The total net yield, allowing for isopropyl methacrylate in the initial trichloroethylene, was 91.4%, and the recovery of trichloroethylene, 94.3%.

EXAMPLE II 5688 grams n-propanol, 120 grams hydroquinone, 120 grams 98% sulphuric acid, 6880 grams methacrylic acid, and 4592 grams trichloroethylene were mixed together in the above order, and boiled under reflux, with automatic separation from the condensed vapours of the aqueous layer in an apparatus similar to that used in Example 1. 1700 cc. of this layer were collected and evolution of water ceased in less than 20 hours. The aqueous layer contained 12.9% by weight of n-propanol, and had density $d_4^{20}$ 0.9845. Allowing for water contents of n-propyl alcohol and trichloroethylene (total 5.4 grams), the water evolved amounted to 1451 grams (100.8% theory).

The reaction mixture was quickly cooled, washed with water, then with 2000 cc. 2N caustic soda (excess over requirements to produce neutrality), and finally with water.

80 grams of hydroquinone were added to the neutralised and washed reaction product, which was then purified by fractional distillation at 200 mm. pressure, using a 6 foot fractionating column of 1½" bore packed with ¼"x¼" glass cuts and lagged with vacuum jackets. The following fractions were obtained:

| Fraction | 1 | 2 | 3 |
|---|---|---|---|
| Distillation range | Up to 55° C./200 mm | 55–96° C./200 mm | 96–98° C./200 mm. |
| Yield (gm.) | 3,634 | 827 | 9,138. |
| Acid Volume (mgm. KOH/gm.) | <0.05 | <0.2 | 0.24. |
| Refractive index $n_D^{20}$ | | | 1.4188. |
| Density $d_4^{20}$ | | 1.2402 | 0.9024. |
| Analysis (percent by weight): | | | |
| Water | 0.3 | | |
| n-propanol | 6.4 | | |
| n-propyl methacrylate | <0.1 | 26.0 | 99.5. |
| Trichloroethylene | 93.2 | 74.0 | |
| Hydroquinone | | | <0.002. |

The realised yields of n-propyl methacrylate were as follows:

|  | Grams | Percent theory |
|---|---|---|
| In fraction II | 215 | 2.1 |
| In fraction III | 9,092 | 89.0 |
| Residue (net, allowing for hydroquinone) | 735 | 7.2 |
| Total | 10,042 | 98.3 |
| Theoretical yield of ester | 10,240 | |

Recovered trichloroethylene, present in fractions I and II—

| In fraction I | grams | 3,389 |
|---|---|---|
| In fraction II | do | 612 |
| Total | do | 4,001 |
| Input | do | 4,589 |
| Recovery, percent by weight | | 87 |

EXAMPLE III 5280 gms. of isopropyl alcohol, 120 gms. of hydroquinone, 120 gms. of 98% sulphuric acid, 6880 gms. of methacrylic acid and 4592 gms. of trichloroethylene were mixed together in the above order and boiled under reflux with automatic separation of the aqueous layer from the condensed vapour in an apparatus similar to that used in Example 1. The net water evolution in the course of the esterification which took 40 hours, amounted to 1411 gms., 98% theoretical.

The reaction mixture was quickly cooled, washed with water, then with 10% sodium hydroxide solution until permanently alkaline to phenolphthalein and finally twice with water. The washed and neutralised reaction mixture was then fractionally distilled using the six-foot packed column used in Example II with the following results:

| Fraction | 1 | 2 | 3 |
|---|---|---|---|
| Distillation range | Up to 55° C./200 mm | 55–85.5° C./200 mm | 85.5–87° C./200 mm. |
| Yield (gm.) | 3,931 | 1,809 | 7,714. |
| Acid Value (mgm. KOH/gm.) | nil | nil | 2. |
| Analysis (percent by weight): | | | |
| Water | 0.12 | | |
| Isopropanol | 1.0 | | |
| Isopropyl methacrylate | 11.5 | 52.3 | 98.4. |
| Trichloroethylene | 87.5 | 47.7 | |

Yields of isopropyl methacrylate obtained were—

|  | Grams | Percent theory |
|---|---|---|
| In fraction I | 452 | 4.4 |
| In fraction II | 946 | 9.2 |
| In fraction III | 7,591 | 74.1 |
| Residue | 317 | 3.1 |
| Total | 9,306 | 90.8 |
| Theoretical yield | 10,240 | |

*Recovery of trichloroethylene*

Trichloroethylene was recovered as follows:

| In fraction I | grams | 3,435 |
|---|---|---|
| In fraction II | do | 863 |
| Total | do | 4,298 |
| Input | do | 4,591 |
| Recovery | per cent | 94.4 |

EXAMPLE IV

An esterification of isopropyl alcohol was carried out as in Example 3 and the washed and neutralised reaction mixture fractionally distilled to give an intermediate fraction (corresponding to fraction 2) having the composition 53.6% isopropyl methacrylate and 45.1% trichloroethylene and having an acid value of 0.8.

30 gm. of hydroquinone were added to 2,782 gms. of this material and fractional distillation thereof was carried out using a six-foot packed column to give the following products:

| Fraction | 1 | 2 | 3 |
|---|---|---|---|
| Distillation range | Up to 55° C./200 mm | 55–85.5° C./200 mm | 85.5–87° C./200 mm. |
| Yield (gm.) | 1,305 | 69 | 1,291. |
| Percent Isopropyl methacrylate | 1.0 | 49.1 | 100. |

A residue of partly polymerised ester (minus hydroquinone) amounting to 104 gms. was also obtained thus giving a distillation loss of 13 gm.

The total amount of recovered pure ester (fraction 3 plus net residue) amounted to 1395 gm., 93.6% of the amount (1492 gm.) of isopropyl methacrylate present in the distilland.

I claim:

1. A process for the production of useful polymerizable materials selected from the group consisting of n-propyl methacrylate and isopropyl methacrylate which comprises the steps of reacting an alcohol selected from the group consisting of n-propanol and isopropanol with methacrylic acid in the presence of a polymerization inhibitor while removing the water of reaction by subjecting the reaction mixture to azeotropic distillation in the presence of an azeotropic-forming liquid selected from the group consisting of benzene, ethylene dichloride, chloroform, di-isopropyl and di-n-propyl ethers, and trichloroethylene, allowing the distillate to separate into two layers, rejecting the aqueous layer, and returning the other layer to the reaction zone, and subsequently when no further aqueous layer is formed, separating the propyl methacrylate from the reaction product by fractional distillation.

2. A process as set forth in claim 1 wherein the fractional distillation is carried out under reduced pressure.

3. A process as set forth in claim 1 wherein said selected alcohol is reacted with the methacrylic acid in the presence of a mineral acid.

4. A process as set forth in claim 3 wherein the mineral acid is sulphuric acid.

JOHN WILLIAM CROOM CRAWFORD.

References Cited in the file of this patent

UNITED STATES PATENTS

| Number | Name | Date |
|---|---|---|
| 1,993,089 | Crawford | Mar. 5, 1935 |
| 2,129,690 | Hill | Sept. 13, 1938 |
| 2,378,169 | Agre et al. | June 12, 1945 |
| 2,388,844 | Hasche et al. | Nov. 13, 1945 |
| 2,404,267 | Barnes | July 16, 1946 |
| 2,416,756 | Jilk | Mar. 4, 1947 |
| 2,458,450 | Utermohlen | Jan. 4, 1949 |

OTHER REFERENCES

Beilstein, "Handbuch der organischen Chemie" (4th ed.), vol. I, Second Supplement (1941), pp. 362, 376 and 377.

Young et al., J. Chem. Soc. (London), vol. 81, pp. 744–748 (1902).